United States Patent [19]

Tulin et al.

[11] 4,313,830
[45] Feb. 2, 1982

[54] METHOD FOR INCREASING THE CROSS-FLOW MICROFILTRATION FLUXES OF WASTE WATERS CONTAINING SUSPENDED SOLIDS AND/OR EMULSIFIED OIL

[75] Inventors: Marshall P. Tulin, Chevy Chase; John E. Santo, Columbia, both of Md.

[73] Assignee: Hydronautics, Incorporated, Laurel, Md.

[21] Appl. No.: 152,639

[22] Filed: May 23, 1980

[51] Int. Cl.³ .............................................. B01D 13/00
[52] U.S. Cl. .................................... 210/639; 210/651; 210/717; 210/778
[58] Field of Search ............... 210/639, 651, 654, 708, 210/714, 716, 717, 777, 778, 193, 500.2

[56] References Cited

U.S. PATENT DOCUMENTS

| | | | |
|---|---|---|---|
| 3,236,768 | 2/1966 | Litt | 210/636 |
| 3,259,567 | 7/1966 | Dunning et al. | 210/639 |
| 3,310,175 | 3/1967 | McLagan | 210/193 |
| 3,398,088 | 8/1968 | Okey | 210/610 |
| 3,445,000 | 5/1969 | Litt | 210/94 |
| 3,556,992 | 1/1971 | Massucco | 210/500.2 |
| 3,733,265 | 5/1973 | Kraus et al. | 210/667 |
| 3,799,806 | 3/1974 | Madsen | 127/54 |
| 3,856,569 | 12/1974 | Strong | 127/34 |
| 3,976,569 | 8/1976 | Sheppard et al. | 210/724 |
| 3,996,131 | 12/1976 | Conn | 210/636 |
| 4,014,787 | 3/1977 | Shorr | 210/639 |
| 4,081,369 | 3/1978 | Li et al. | 210/638 |
| 4,155,845 | 5/1979 | Ancelle et al. | 162/29 |
| 4,207,183 | 6/1980 | Herrigel | 210/639 |

FOREIGN PATENT DOCUMENTS 51-1045450  4/1976  Japan .................................. 210/778

OTHER PUBLICATIONS

Santo et al., "Removal of Heavy Metals from Battery Manu. Wastewaters by Hydroperm TM Cross-Flow Microfiltration," Presented at 2nd Conf. on Adv. Poll. Cont. for Metal Finishing Industry, Feb. 5-7, 1979, pp. 123-130.

*Primary Examiner*—Peter A. Hruskoci
*Attorney, Agent, or Firm*—Finnegan, Henderson, Farabow, Garrett & Dunner

[57] ABSTRACT

A method for increasing the cross-flow microfiltration fluxes of waste waters containing suspended solids and/or emulsified oil through microporous thermoplastic tubes by including therein a calcium compound selected from $Ca(OH)_2$ or $CaSO_4$. The calcium compound is present in the waste waters in an amount ranging from above the solubility limit of the compound to about forty (40) percent by weight of the waste waters. The $Ca(OH)_2$ can be added directly to the waste water. The $CaSO_4$ can be included by reacting $H_2SO_4$ and $Ca(OH)_2$ in the waste waters to form $CaSO_4$ in situ. Alternatively, wet $CaSO_4$ can be formed by reacting $H_2SO_4$ with $Ca(OH)_2$ outside the water and then added to to the waste waters in the required amount.

10 Claims, 2 Drawing Figures

METHOD FOR INCREASING THE CROSS-FLOW MICROFILTRATION FLUXES OF WASTE WATERS CONTAINING SUSPENDED SOLIDS AND/OR EMULSIFIED OIL

BACKGROUND OF THE INVENTION

The present invention relates to the treatment of waste waters containing suspended solids and/or emulsified oil. More specifically, the invention relates to a method for increasing the cross-flow microfiltration fluxes of waste waters containing suspended solids and/or emulsified oil.

In treating both domestic and industrial waste waters, removal of suspended solids, including solids of colloidal dimensions, is generally a required unit operation. Through-flow filtration, utilizing, for example, multi-media filters, and cross-flow filtration utilizing, for example, ultrafiltration and reverse osmosis, have been widely used in the art to remove such suspended solids.

Conventional through-flow filters, however, disadvantageously require back washing to eliminate filtered particles which continuously accumulate on and enter into the filtration barrier. Thus by its very nature, through-flow filtration is a batch process wherein the filtration flux (the rate of transfer of the permeate across the filter surface) declines relatively rapidly if the driving pressure differential across the filtration barrier is held constant. A decline in filtration flux is thus a well-recognized problem.

In cross-flow or ultrafiltration, however, because the direction of the feed flow is tangential to the filter surface, accumulation of the filtered solids on the filtered medium can be minimized by the shearing action of the flow. Cross-flow filtration thus affords, at least in principle, the possibility of a quasi-steady operation with a nearly-constant flux when the driving pressure differential is held constant. Unfortunately, this theoretical possibility has not been achieved in practice. Thus, the problem of declining filtration fluxes has continued to plague cross-flow filtration of domestic and industrial waste waters.

A method of cross-flow microfiltration utilizing thick-walled, porous thermoplastic tubes has recently been developed by Hydronautics, Incorporated of Laurel, Md. The filtration characteristics of these tubes, sold by Hydronautics, Incorporated under its trademark HYDROPERM TM, combine both the "indepth" filtration aspects of multi-media filters and the "thin-skinned" aspects of membrane ultrafilters. The HYDROPERM" tubes differ from conventional membrane ultrafilters by having pore sizes of the order of several microns wherein the length of a pore is many times that of its diameter. These tubes are described in greater detail in report No. 77-ENAS-51 of the American Society of Mechanical Engineers entitled "Removal of Suspended and Colloidal Solids from Waste Streams by the Use of Cross-Flow Microfiltration," which is incorporated herein by reference.

In general, any effluent from which suspended solid removal is desired will contain a wide range of particulate sizes, ranging in diameter from several microns down to colloidal dimensions. Because of the "in-depth" filtration characteristics of the thick-walled, thermoplastic tubes, such as HYDROPERM TM tubes, particles smaller than the largest pore size of a tube enter the wall matrix, whereas particles larger than the largest pore size are retained at the walls of the tube.

Those particles entering into the wall matrix ultimately become entrapped within it because of the irregular and tortuous nature of the pores. As microfiltration proceeds, the pore structure of a tube is gradually clogged by entrapped particles, resulting in a gradual filtration flux decline, approximately exponentially related to filtration time. Thus, the art has sought a method for preventing filtration flux declines in thick-walled, microporous thermoplastic tubes.

Further, in addition to seeking to overcome the problem of flux decline, the art has continually sought a method for increasing the filtration flux of cross-flow microfiltration tubes above those levels presently obtainable. Increases in the flux allow for more economical processing of waste waters. The art has also sought a method for reducing the suspended solids content of permeate.

The present invention increases the solids content of waste waters by utilizing certain solid additives in specific amounts. Suprisingly, substantial increases in cross-flow microfiltration fluxes are achieved and the permeate contains less suspended solids. Although tests, to be described in detail infra, show that notwithstanding the additive, the cross-flow microfiltration fluxes decline over a twenty-four hour period, the fluxes after twenty-four hours are nonetheless significantly higher than the starting fluxes achieved in identical cross-flow filtration systems lacking the additives used in the amounts required by the present invention. Thus, the significant increases in cross-flow microfiltration fluxes obtained by the present invention, both initially and over a twenty-four hour period, are a significant contribution to the cross-flow microfiltration art.

SUMMARY OF THE INVENTION

As broadly stated, the present invention provides a method for increasing the cross-flow microfiltration fluxes waste waters containing suspended solids and/or emulsified oil. A calcium compound selected from the group consisting of calcium hydroxide and calcium sulfate is included in the waste waters in an amount ranging from above the solubility limit of the calcium compound to about forty (40) percent by weight of the waste waters. Preferably, the calcium compound is included in an amount ranging from above the solubility limit of the calcium compound to about ten (10) percent by weight of the waste waters. The waste waters containing this amount of the calcium compound are filtered by cross-flow microfiltration through microporous thermoplastic tubes.

The calcium sulfate can be included in the waste water either by (1) adding sulfuric acid to the waste waters in an amount sufficient to lower the pH of the waste waters to an acidic value and then adding calcium hydroxide to the acidified waste waters in an amount sufficient to form the calcium sulfate in situ in the waste waters or (2) forming wet calcium sulfate by reacting sulfuric acid with calcium hydroxide and adding the wet calcium sulfate to the waste water.

DETAILED DESCRIPTION OF THE PREFERRED EMBODIMENTS

Figure 1:
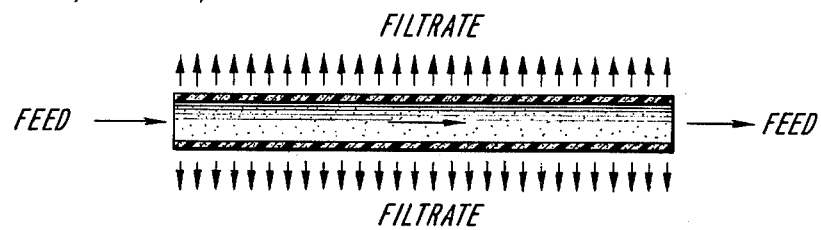
FIG. 1 is a schematic of a cross-flow microfiltration tube.

The present invention is useful in increasing the flux during cross-flow microfiltration of waste waters containing suspended solids, including particles of colloidal dimensions, and/or emulsified oil. A representative waste water containing suspended solids which can be treated in accordance with the present invention is laundry waste. The invention is also useful in treating waste waters containing emulsified oil, such as the emulsified oily wastes resulting from metal cutting operations.

Calcium hydroxide is a soft, white crystalline powder with an alkaline, slightly bitter taste. Sources of calcium hydroxide ($Ca(OH)_2$) useful in the present invention include calcium hydrate, hydrated lime, caustic lime and slaked lime, all of which are readily available commercially.

The amount of $Ca(OH)_2$ added to the waste waters ranges in an amount from above the solubility limit of the calcium hydroxide to about forty (40) percent by weight of the waste waters. Preferably, the amount of $Ca(OH)_2$ added ranges from above the solubility limit to about ten (10) percent by weight of the waste waters. More preferably, the amount of $Ca(OH)_2$ ranges from above the solubility limit to about three (3) percent by weight of the waste waters. Because the solubility limit of $Ca(OH)_2$ depends to an extent on the other ions present in a particular waste water, it will vary for different waste waters. The solubility limit for a particular waste water, however, can easily be determined.

For present purposes, calcium sulfate ($CaSO_4$) formed in situ in $CaSO_4$ formed from the reaction of sulfuric acid ($H_2SO_4$) with $Ca(OH)_2$ within the waste waters themselves. Off-line or wet calcium sulfate ($CaSO_4$) is $CaSO_4$ formed by reacting $H_2SO_4$ with $Ca(OH)_2$ in an environment other than the waste water. The solid $CaSO_4$ is referred to as "wet" because it is added to the waste waters in its own mother liquor.

To form $CaSO_4$ in situ in accordance with the present invention, any commercially available $H_2SO_4$ is added to the waste waters in an amount sufficient to lower the pH of the waste waters to an acidic value, preferably about 1. Any commercially available $Ca(OH)_2$ is then added to the acifified waste waters in amounts sufficient to form in situ $CaSO_4$ in an amount ranging from above the solubility limit of $CaSO_4$ to about forty (40) percent of weight of the waste waters. Preferably, the $CaSO_4$ is formed in an amount ranging from above the solubility limit of the $CaSO_4$ to about ten (10) percent by weight of the waste waters. More preferably, the $CaSO_4$ is formed in an amount ranging from above the solubility limit of $CaSO_4$ to about three (3) percent by weight of the waste waters. As with $Ca(OH)_2$, because the solubility limit of $CaSO_4$ depends to an extent on the other ions present in a particular waste water, it will vary for different waste waters. The solubility limit of $CaSO_4$ for a particular waste water, however, can easily be determined.

Wet $CaSO_4$ is prepared by reacting any commercially available $H_2SO_4$ with any commercially available $Ca(OH)_2$. The wet $CaSO_4$ is then added to the waste waters in an amount sufficient to supply a quantity of $CaSO_4$ ranging from above the solubility limit of $CaSO_4$ to about forty (40) percent by weight of the waste waters, preferably from above the solubility limit of $CaSO_4$ to about ten (10) percent by weight of the waste waters and more preferably, from above the solubility limit of $CaSO_4$ to about three (3) percent by weight of the waste waters.

After the solid additives are present in the proper amount in the waste waters to be filtered, cross-flow microfiltration is accomplished by the use of microporous thermoplastic tubes. These tubes can be made from a wide variety of extrudable thermoplastics. Preferably, these tubes are made of nylon or polyethylene, and have (1) walls of about one (1) millimeter in thickness; (2) a dominant pore size ranging from one (1) to ten (10) microns; and (3) a porosity of about 65%, i.e., the pores cover 65% of the surface area of the tubes. The preferred microporous thermoplastic tubes useful in the present invention are the HYDROPERM TM tubes described above which are commercially available from Hydronautics, Incorporated of Laurel, Md.

A schematic view of cross-flow filtration through a thick-walled, microporous thermoplastic tube is shown in FIG. 1. A waste water feed flows through the inside of the tubes at such relatively low pressures as 2 to 50 psi and filtrate permeation occurs through the tube walls, which are relatively thick, having a thickness of approximately one millimeter. Use of low pressure and thick walls differentiate this type of cross-flow microfiltration from conventional membrane ultrafiltration, which utilizes filtration pressures approximately greater than or equal to 50 psi and much thinner membranes.

Figure 2:
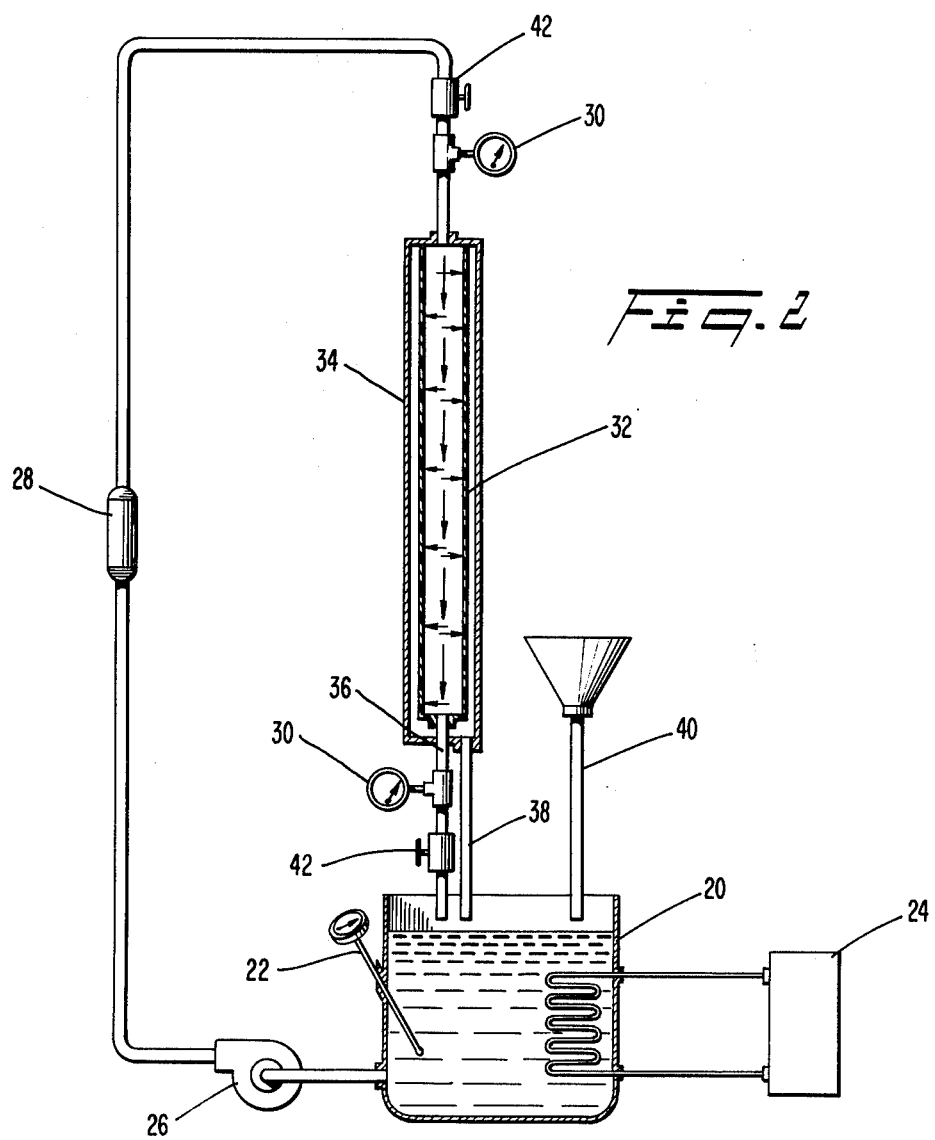
FIG. 2 is a schematic of a single-tube test loop.

The examples presented herein derive from cross-flow microfiltration tests, each of which was performed with a single, nylon microporous tube. A schematic of the single tube test loop is presented in FIG. 2. As indicated in FIG. 2, the loop contains a feed reservoir 20 having approximately a three-gallon capacity, a thermometer 22 and a temperature control unit 24 for the feed reservoir. A circulating pump 26 draws the test fluid from the reservoir and, a flow meter 28, and pressure gauges 30 are provided to measure respectively the velocity of the feed and the pressure drops over the length of the tube being tested. A cross-flow, microfiltration tube 32, surrounded by a permeate collecting jacket 34 is included in the loop and a feed line 36 and a permeate line 38 are provided for returning the test solution to the reservoir. A line 40 to add additional feed to compensate for evaporation and appropriate valves 42 are also provided in the test loop.

The internal diameter of each nylon microporous tube utilized in the examples was 6 millimeters and the external diameter was 8 millimeters. The tubes had a length of 46 centimeters and a filtration area of approximately 130 $cm^2$. The tubes had a 65% porosity with pore sizes ranging from 2-10 microns.

The tests were carried out in a "constant concentration-constant volume" mode, i.e., the permeate was remixed into the feed reservoirs so that the volume of the circulating feed, as well as its suspended solids concentration, remained relatively constant.

EXAMPLE I

Utilizing the test apparatus shown in FIG. 2, a comparative example was first run to establish the flux value of a laundry waste containing about 2.44 g/l of total solids of which 1.6 g/l were suspended solids and 0.8 g/l were dissolved solids. This example was carried out at a pressure of 5 psi with a velocity of the feed of 7 ft/sec. The starting flux was 88.6 gal/day/$ft^2$ and it declined to 70.9 gal/day/$ft^2$ after 24 hours. The permeate contained 5 ppm of suspended solids.

EXAMPLE II

The pH of the same laundry waste used in Example I was lowered to 1 with $H_2SO_4$ and subsequently adjusted to 9 with slaked lime ($Ca(OH)_2$). The $H_2SO_4$ and $Ca(OH)_2$ reacted in the laundry waste to form $CaSO_4$ in situ in such an amount that the suspended solid content of the waste was raised from 2.44 g/l or 0.244% to 26 g/l or 2.6%. The suspended solid content of $CaSO_4$ was then approximately 23.5 g/l or approximately 2.35% by weight of the waste water. Cross-flow microfiltration was carried out under the same pressure and velocity conditions of Example I, utilizing an identical testing apparatus. The starting flux was 760.3 gal/day/ft² and it declined to 207.08 gal/day/ft² after 24 hours. Analysis of the permeate showed less than one part for million suspended solid content. Since identical filtration conditions were employed in Examples I and II, Example II demonstrates that the significantly increased flux obtained, which was almost ten times greater, and the smaller amount of suspended solids in the permeate are attributable to the formation of in situ $CaSO_4$ in the laundry waste.

EXAMPLE III

The suspended solid content of the same laundry waste used in Example I, was raised by adding 8.5 g/l or 0.85% by weight of the waste water wet $CaSO_4$ that had been prepared outside the waste water by reacting $H_2SO_4$ with $Ca(OH)_2$. Utilizing identical filtration and testing conditions as in Example I, the starting flux was 1042.0 ga/day/ft², and declined to only 255.0 gal/day/ft² after 24 hours. Again, since the same waste material and conditions as in Example I were utilized in Example III, the results of Example III demonstrate that significantly increased flux results were obtained from adding wet or off-line $CaSO_4$ to the laundry waste before filtering it.

EXAMPLE IV

Commercial slaked lime was added, in the amount of 3% or 30 g/l to the same laundry waste used in Example I. Crossflow microfiltration was carried out under the same conditions as in Example I. The starting flux was 595.4 gal/day/ft² and it declined to 108.6 gal/day/ft² after 24 hours. The analyzed permeate contained less than 1 ppm suspended solids. Again, significantly increased fluxes and smaller amounts of suspended solids in the permeate are attributable to the addition of lime ($Ca(OH)_2$) to the laundry waste.

EXAMPLE V

As a comparative example, emulsified oily waste from a metal cutting operation, having a total solid content of 5740 ppm of which 1678 ppm were suspended solids, was subjected to cross-flow microfiltration under the same conditions and testing apparatus as in Example I. A starting flux of 83.1 gal/day/ft² declined to less than 5 gal/day/ft² after 24 hours.

EXAMPLE VI

The pH of the same oily waste water used in Example V was adjusted to 1 using $H_2SO_4$ and readjusted to 9 with slaked lime, thus forming $CaSO_4$ in situ. Using the same filtration conditions as in Example V, a starting flux of 817.6 gal/day/ft² was achieved which declined to only 250.0 gal/day/ft² after 24 hours of filtration.

The following table summarizes the results achieved in these Examples.

TABLE I

| Example No. | Additive | Flux gal/day/ft² Start | 24 hr | Comments |
|---|---|---|---|---|
| I | | 88.6 | 70.9 | |
| II | in situ $CaSO_4$ | 760.3 | 207.08 | The additive was prepared in the wastewater |
| III | wet $CaSO_4$ | 1042.0 | 255.0 | The additive was prepared outside the wastewater and added in its own mother liquor |
| IV | $Ca(OH)_2$ | 595.4 | 108.6 | Commercial slaked lime |
| V | | 83.1 | <5 | |
| VI | in situ $CaSO_4$ | 817.6 | 250.0 | The additive was prepared in the waste water |

I claim:

1. A method for increasing the cross-flow microfiltration fluxes of waste waters containing suspended solids and/or emulsified oil comprising the steps of:
   (a) adding sulfuric acid to waste waters in an amount sufficient to lower the pH of said waste waters to an acidic value,
   (b) adding calcium hydroxide to said acidified waste waters in an amount sufficient to form calcium sulfate in situ in the waste water in an amount ranging from above the solubility limit of said calcium sulfate to about forty (40) percent by weight of said waste waters and,
   (c) filtering said waste waters containing said calcium sulfate by cross-flow microfiltration through microporous thermoplastic tubes, wherein said microporous tubes: (i) are made of an extrudable thermoplastic composition selected from the group consisting of nylon and polyethylene; (ii) have walls about one (1) millimeter in thickness; (iii) have a dominant pore size ranging from one (1) to ten (10) microns; and (iv) having a porosity of about 65 percent.

2. The method of claim 1 wherein said sulfuric acid is added in an amount sufficient to lower the pH of said waste waters to about 1 and the calcium hydroxide raises the pH to approximately 9.

3. The method of claim 1 wherein said amount of calcium sulfate ranges from above the solubility limit thereof to about ten (10) percent by weight of said waste waters.

4. The method of claim 3 wherein said amount of calcium sulfate ranges from above the solubility limit thereof to about three (3) percent by weight of said waste waters.

5. A method for increasing the cross-flow microfiltration fluxes of waste waters containing suspended solids and/or emulsified oil comprising the steps of:

(a) forming wet calcium sulfate by reacting sulfuric acid with calcium hydroxide;
(b) adding said wet calcium sulfate to waste waters in an amount ranging from above the solubility limit of said calcium sulfate to about forty (40) percent by weight of said waste waters and, filtering said waste waters containing said calcium sulfate by cross-flow microfiltration through microporous thermoplastic tubes, wherein said microporous tubes: (i) are made of an extrudable thermoplastic composition selected from the group consisting of nylon and polyethylene; (ii) have walls about one (1) millimeter in thickness; (iii) have a dominant pore size ranging from one (1) to ten (10) microns; and (iv) having a porosity of about 65 percent.

6. The method of claim 5 wherein said amount of wet calcium sulfate ranges from about the solubility limit thereof to about ten (10) percent by weight of said waste waters.

7. The method of claim 6 wherein said amount of wet calcium sulfate ranges from above the solubility limit thereof to about three (3) percent by weight of said waste waters.

8. The method of claim 1 or 5 wherein said waste waters are laundry waste waters.

9. The method of claim 1 or 5 where said waste waters are oily waste waters from a metal-cutting operation.

10. The method of claim 1 or 5 wherein said calcium hydroxide is selected from the group consisting of calcium hydrate, hydrated lime, caustic lime and slaked lime.

* * * * *

UNITED STATES PATENT AND TRADEMARK OFFICE
CERTIFICATE OF CORRECTION

PATENT NO. : 4,313,830
DATED : February 2, 1982
INVENTOR(S) : MARSHALL P. TULIN ET AL.

It is certified that error appears in the above—identified patent and that said Letters Patent is hereby corrected as shown below:

Claim 6, column 8, line 2, change "about" to --above--.

Signed and Sealed this

First Day of June 1982

[SEAL]

Attest:

Attesting Officer

GERALD J. MOSSINGHOFF
Commissioner of Patents and Trademarks